United States Patent
Breaux

(10) Patent No.: US 11,525,350 B2
(45) Date of Patent: Dec. 13, 2022

(54) ACOUSTIC SENSOR SYSTEMS AND METHODS

(71) Applicant: HALLIBURTON ENERGY SERVICES, INC., Houston, TX (US)

(72) Inventor: Brian David Breaux, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 263 days.

(21) Appl. No.: 16/652,150

(22) PCT Filed: Dec. 12, 2019

(86) PCT No.: PCT/US2019/066032
§ 371 (c)(1),
(2) Date: Mar. 30, 2020

(87) PCT Pub. No.: WO2020/236220
PCT Pub. Date: Nov. 26, 2020

(65) Prior Publication Data
US 2021/0404321 A1    Dec. 30, 2021

Related U.S. Application Data

(60) Provisional application No. 62/850,408, filed on May 20, 2019.

(51) Int. Cl.
    *E21B 47/002*    (2012.01)
    *G01V 1/52*    (2006.01)
(52) U.S. Cl.
    CPC .......... *E21B 47/0025* (2020.05); *G01V 1/52* (2013.01); *G01V 2001/526* (2013.01); *G01V 2200/16* (2013.01)

(58) Field of Classification Search
    CPC ........................ E21B 47/002; E21B 47/0025
    See application file for complete search history.

(56) References Cited

U.S. PATENT DOCUMENTS

| | | | | |
|---|---|---|---|---|
| 5,043,948 A | * | 8/1991 | Hallmark | G01V 1/52 367/25 |
| 5,678,643 A | | 10/1997 | Robbins et al. | |
| 5,987,385 A | * | 11/1999 | Varsamis | E21B 47/18 702/6 |
| 7,950,451 B2 | * | 5/2011 | Alberty | E21B 47/10 175/48 |

(Continued)

FOREIGN PATENT DOCUMENTS

| | | |
|---|---|---|
| WO | 00-16128 A1 | 3/2000 |
| WO | 2005-008028 A1 | 1/2005 |

OTHER PUBLICATIONS

International Search Report; PCT Application No. PCT/US2019/066032, dated Apr. 20, 2020.

*Primary Examiner* — Shane Bomar
(74) *Attorney, Agent, or Firm* — Polsinelli PC

(57) ABSTRACT

Disclosed is an acoustic sensor system comprising an electrical connector, at least one transducer connected to the electrical connector, a fluid compensating piston connected to the electrical connector, a housing having the electrical connector, the at least one transducer, and the fluid compensating piston arranged in a linear arrangement, and a collar having the housing mounted along an interior surface of the collar.

13 Claims, 16 Drawing Sheets

(56) References Cited

U.S. PATENT DOCUMENTS

| | | | |
|---|---|---|---|
| 8,890,531 B2* | 11/2014 | Beste | G01V 3/28 |
| | | | 324/339 |
| 9,970,285 B2* | 5/2018 | Sugiura | E21B 7/04 |
| 10,921,478 B2* | 2/2021 | Palani | E21B 47/085 |
| 11,313,215 B2* | 4/2022 | Yi | E21B 47/01 |
| 11,333,016 B2* | 5/2022 | Jin | E21B 49/00 |
| 2005/0006090 A1* | 1/2005 | Chemali | E21B 17/1078 |
| | | | 166/250.01 |
| 2006/0067162 A1 | 3/2006 | Blankinship et al. | |
| 2011/0138903 A1 | 6/2011 | Large et al. | |
| 2017/0254916 A1* | 9/2017 | Yu | E21B 47/12 |
| 2017/0335685 A1* | 11/2017 | Breaux | E21B 47/085 |
| 2018/0149013 A1* | 5/2018 | Ang | E21B 47/017 |
| 2018/0156025 A1* | 6/2018 | Manders | G01N 29/341 |
| 2019/0086572 A1* | 3/2019 | Yang | E21B 47/017 |
| 2021/0199833 A1* | 7/2021 | Davies | G01V 1/30 |

\* cited by examiner

ACOUSTIC SENSOR SYSTEMS AND METHODS

CROSS-REFERENCE TO RELATED APPLICATIONS

This application claims the benefit of priority to U.S. Appl. No. 62/850,408 filed May 20, 2019, entitled Acoustic Sensor Systems and Methods, the entire contents of which is hereby incorporated herein by reference.

TECHNICAL FIELD

The present technology pertains to one or more acoustic sensors that capture data and create a visual scan of a downhole environment.

BACKGROUND

The size and shape of conventional acoustic sensor coverings used in downhole environments rendered them inflexible and incapable of bending without presenting risk to the components. In addition, the conventional acoustic sensors were arranged in a manner such that they could not be housed in a conventional shell with a suitable radius. The conventional shell was too large and bulky and the components were often stacked upon one another. As a result, the conventional devices and associated components would suffer from fatigue, weaken, and break as a result of extreme forces on the devices that caused bending, buckling, and deforming of the devices.

It is with these issues in mind, among others, that various aspects of the disclosure were conceived.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. The embodiments herein may be better understood by referring to the following description in conjunction with the accompanying drawings in which like reference numerals indicate analogous, identical, or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
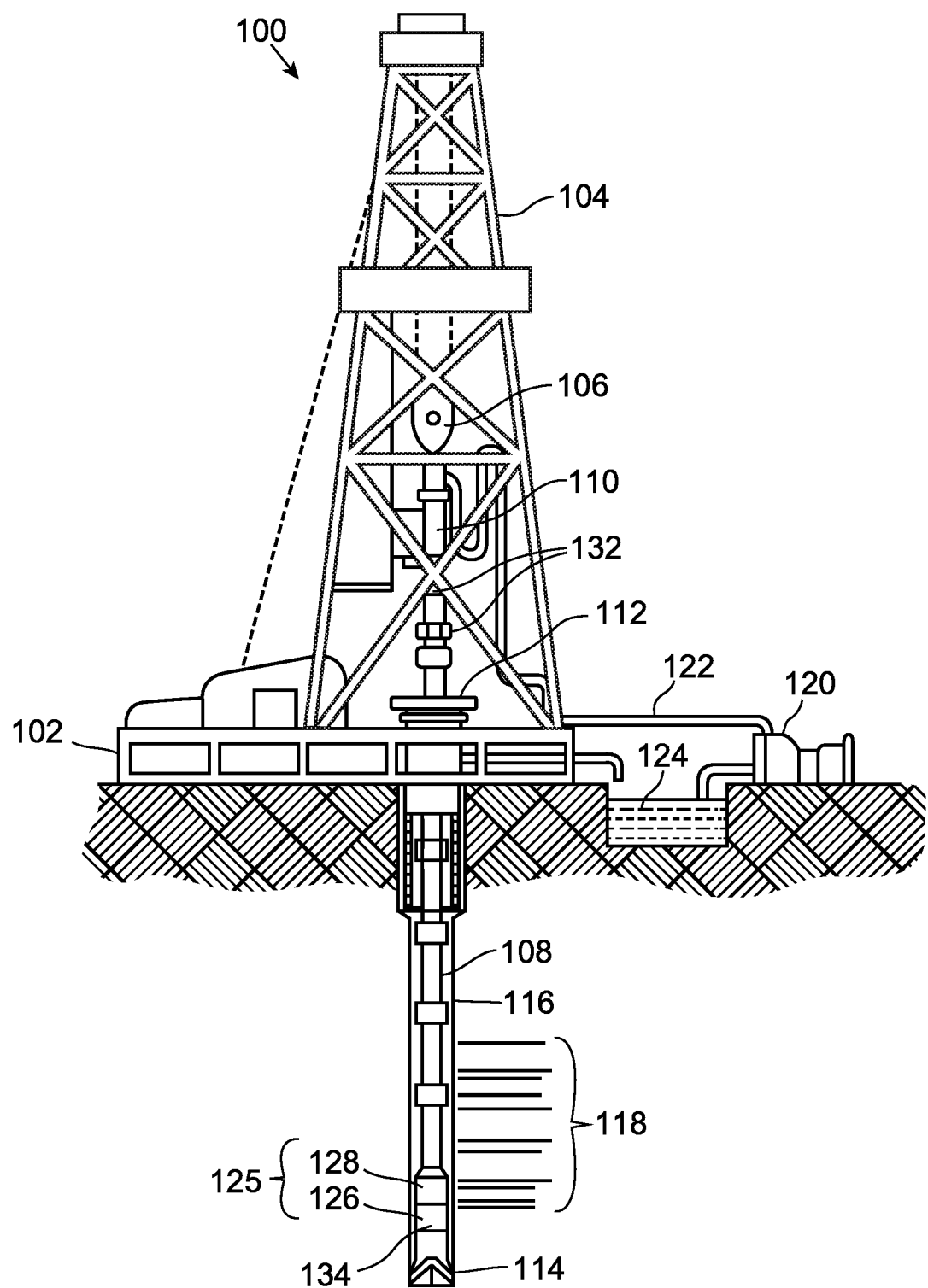
FIG. 1A is a schematic diagram of an example logging while drilling (LWD) wellbore operating environment, in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed apparatus and methods may be implemented using any number of techniques. The disclosure should in no way be limited to the illustrative implementations, drawings, and techniques illustrated herein, but may be modified within the scope of the appended claims along with their full scope of equivalents. The various characteristics described in more detail below will be readily apparent to those skilled in the art with the aid of this disclosure upon reading the following detailed description, and by referring to the accompanying drawings.

The one or more acoustic sensors may together be packaged in a mechanical housing, shell, packaging, or assembly that uses one or more ultrasonic transducers in addition to other components to capture data in a downhole environment. The one or more transducers may be mounted within the housing, shell, packaging, or assembly in a way that allows them to be more flexible than alternative solutions and withstand extreme environmental conditions and severe alternating loads and forces. The one or more transducers may function during these extreme environmental conditions and the assembly may withstand fatigue associated with the severe alternating loads and forces. The assembly may have a shape that is capable of withstanding fatigue loads and a linear arrangement of subcomponents in the assembly. Other packages are larger and often included components that are stacked on one another, do not allow for transducers capable of capturing high-resolution images, and are unable to withstand the extreme environmental conditions. Because of their design and configuration, the alternative packages include features that do not withstand the stress associated with the loads provided by the extreme environmental conditions. The packaging and assembly discussed herein allows for and holds a number of larger acoustic sensors that may capture high-resolution data simultaneously and may be arranged to withstand these conditions.

Disclosed herein are systems, methods, and computer-readable storage media for capturing a visual scan of a downhole environment using at least one acoustic sensor. The at least one acoustic sensor may be arranged in a housing that is received in a collar that together simultaneously captures one or more visual scans of the downhole environment. The one or more visual scans of the downhole environment may be combined together into a high-resolution visual scan of the downhole environment.

According to at least one aspect, an example system for capturing a visual scan of a downhole environment using at least one acoustic sensor is provided. An acoustic sensor system can include an electrical connector, at least one transducer connected to the electrical connector, a fluid compensating piston connected to the electrical connector, a housing having the electrical connector, the at least one transducer, and the fluid compensating piston arranged in a linear arrangement, and a collar having the housing mounted along an interior surface of the collar.

According to at least one aspect, an example system for capturing a visual scan of a downhole environment using at least one acoustic sensor is provided. The acoustic system can include a first electrical connector, a second electrical connector, a third electrical connector, and a fourth electrical connector, a first transducer connected to the first electrical connector, a second transducer connected to the second electrical connector, a third transducer connected to the third electrical connector, and a fourth transducer connected to the fourth electrical connector, a first fluid compensating piston connected to the first electrical connector, a second fluid compensating piston connected to the second electrical connector, a third fluid compensating piston connected to the third electrical connector, and a fourth fluid compensating piston connected to the fourth electrical connector, a first housing having the first electrical connector, the first transducer, and the first fluid compensating piston arranged in a linear arrangement, a second housing having the second electrical connector, the second transducer, and the second fluid compensating piston arranged in the linear arrangement, a third housing having the third electrical connector, the third transducer, and the third fluid compensating piston arranged in the linear arrangement, a fourth housing having the fourth electrical connector, the fourth transducer, and the fourth fluid compensating piston arranged in the linear arrangement, and a collar having the first housing mounted along a first interior surface of the collar, the second housing mounted along a second interior surface of the collar, the third housing mounted along a third interior surface of the collar opposite the first interior surface of the collar, and the fourth housing mounted along a fourth interior surface of the collar opposite the second interior surface of the collar.

According to at least one aspect, an example method for capturing a visual scan of a downhole environment using at least one acoustic sensor is provided. The method can include capturing, by a first acoustic sensor, a first visual scan of a downhole environment, capturing, by a second acoustic sensor, a second visual scan of the downhole environment, capturing, by a third acoustic sensor, a third visual scan of the downhole environment, capturing, by a fourth acoustic sensor, a fourth visual scan of the downhole environment, and combining the first visual scan of the downhole environment, the second visual scan of the downhole environment, the third visual scan of the downhole environment, and the fourth visual scan of the downhole environment into a combined visual scan of the downhole environment.

Figure 14:
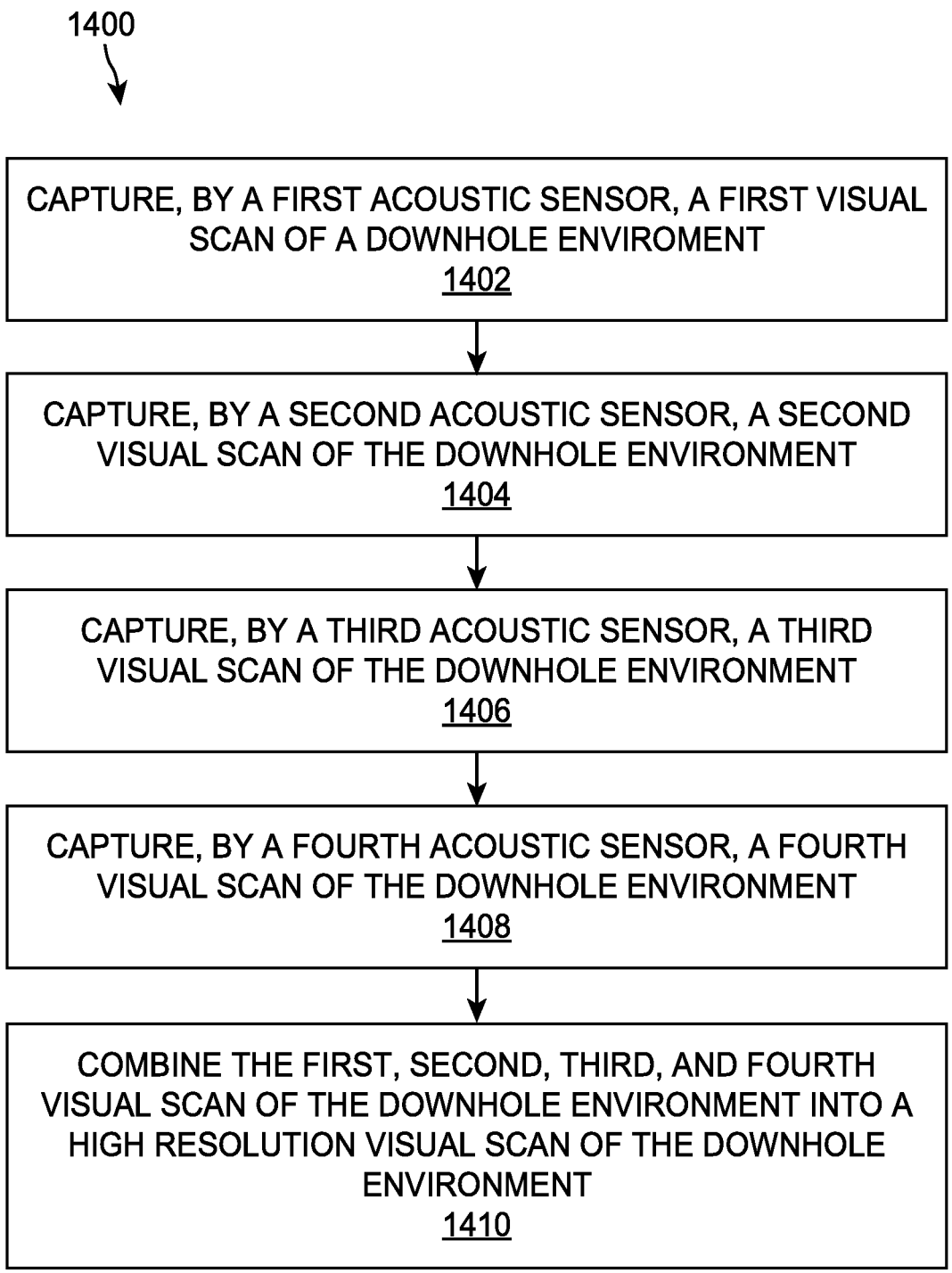
FIG. 14 is a flowchart of an example method for capturing a visual scan using an acoustic sensor system having one or more acoustic sensors, in accordance with some examples.
Figure 15:
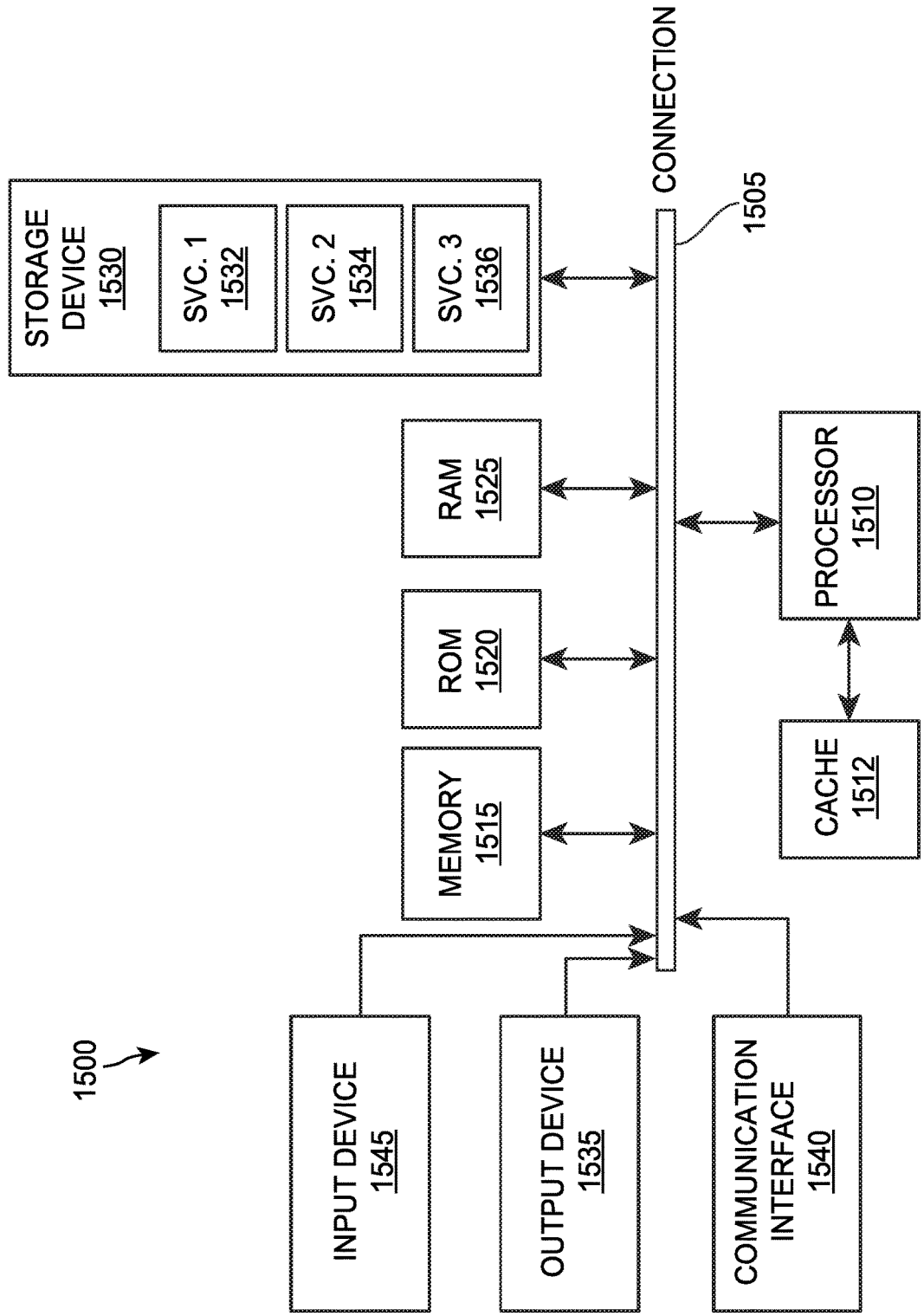
FIG. 15 is a schematic diagram of an example computing device architecture, in accordance with some examples.

As follows, the disclosure will provide a more detailed description of the systems, methods, computer-readable media and techniques herein for capturing a visual scan of a downhole environment using at least one acoustic sensor. The disclosure will begin with a description of example systems and environments, as shown in FIGS. 1A through 13. A description of example methods and technologies for capturing a visual scan of a downhole environment using at least one acoustic sensor, as shown in FIG. 14, will then follow. The disclosure concludes with a description of an example computing system architecture, as shown in FIG. 15, which can be implemented for performing computing operations and functions disclosed herein. These variations shall be described herein as the various embodiments are set forth.

The disclosure now turns to FIG. 1A, which illustrates a schematic view of a logging while drilling (LWD) wellbore operating environment 100 in accordance with some examples of the present disclosure. As depicted in FIG. 1A, a drilling platform 102 can be equipped with a derrick 104 that supports a hoist 106 for raising and lowering a drill string 108. The hoist 106 suspends a top drive 110 suitable for rotating and lowering the drill string 108 through a well head 112. A drill bit 114 can be connected to the lower end of the drill string 108. As the drill bit 114 rotates, the drill bit 114 creates a wellbore 116 that passes through various formations 118. A pump 120 circulates drilling fluid through a supply pipe 122 to top drive 110, down through the interior of drill string 108 and orifices in drill bit 114, back to the surface via the annulus around drill string 108, and into a retention pit 124. The drilling fluid transports cuttings from the wellbore 116 into the retention pit 124 and aids in maintaining the integrity of the wellbore 116. Various materials can be used for drilling fluid, including oil-based fluids and water-based fluids.

Logging tools 126 can be integrated into the bottom-hole assembly 125 near the drill bit 114. As the drill bit 114 extends the wellbore 116 through the formations 118, logging tools 126 collect measurements relating to various formation properties as well as the orientation of the tool and various other drilling conditions. The bottom-hole assembly 125 may also include a telemetry sub 128 to transfer measurement data to a surface receiver 132 and to receive commands from the surface. In at least some cases, the telemetry sub 128 communicates with a surface receiver 132 using mud pulse telemetry. In some instances, the telemetry sub 128 does not communicate with the surface, but rather stores logging data for later retrieval at the surface when the logging assembly is recovered.

Each of the logging tools 126 may include one or more tool components spaced apart from each other and communicatively coupled with one or more wires and/or other media. The logging tools 126 may also include one or more computing devices 134 communicatively coupled with one or more of the one or more tool components by one or more wires and/or other media. The one or more computing devices 134 may be configured to control or monitor performance of the tool, process logging data, and/or carry out one or more aspects of the methods and processes of the present disclosure.

In at least some instances, one or more of the logging tools 126 may communicate with a surface receiver 132 by a wire, such as wired drillpipe. In other cases, the one or more of the logging tools 126 may communicate with a surface receiver 132 by wireless signal transmission. In at least some cases, one or more of the logging tools 126 may receive electrical power from a wire that extends to the surface, including wires extending through a wired drillpipe.

Figure 1B:
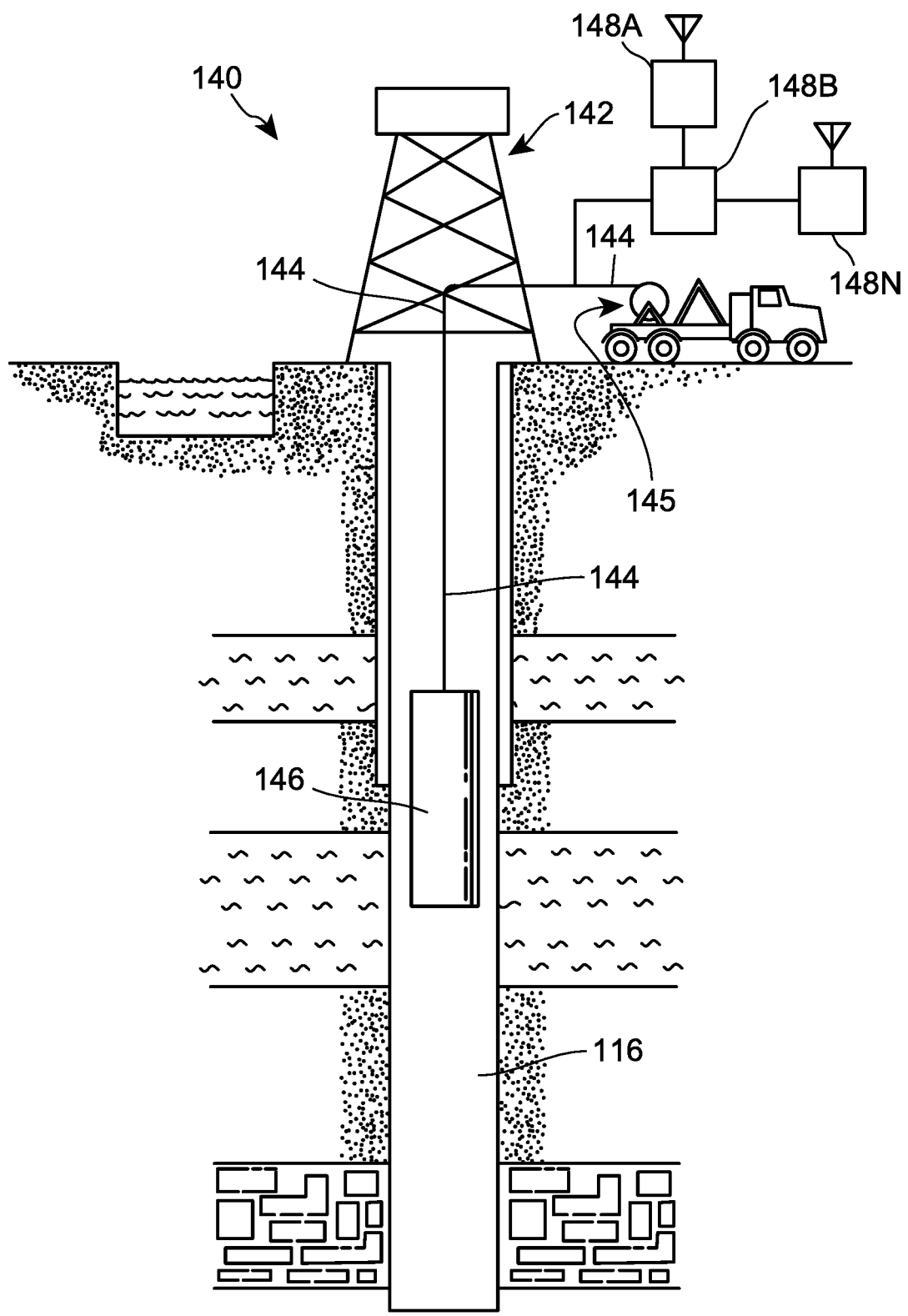
FIG. 1B is a schematic diagram of an example downhole environment having tubulars, in accordance with some examples.

Referring to FIG. 1B, an example system 140 for downhole line detection in a downhole environment having tubulars can employ a tool having a tool body 146 in order to carry out logging and/or other operations. For example, instead of using the drill string 108 of FIG. 1A to lower tool body 146, which may contain sensors or other instrumentation for detecting and logging nearby characteristics and conditions of the wellbore 116 and surrounding formation, a conveyance 144 can be used. The tool body 146 can include a logging tool. The tool body 146 can be lowered into the wellbore 116 by conveyance 144. The conveyance 144 can be anchored in the drill rig 145 or in a portable means such as a truck. The conveyance 144 can include one or more wires, slicklines, cables, and/or the like, as well as tubular conveyances such as coiled tubing, joint tubing, or other tubulars, and may include a downhole tractor.

The illustrated conveyance 144 provides support for the tool, as well as enabling communication between tool processors 148A-N on the surface and providing a power supply. In some examples, the conveyance 144 can include electrical and/or fiber optic cabling for carrying out communications. The conveyance 144 is sufficiently strong and flexible to tether the tool body 146 through the wellbore 116, while also permitting communication through the conveyance 144 to one or more processors 148A-N, which can include local and/or remote processors. Moreover, power can be supplied via the conveyance 144 to meet power requirements of the tool. For slickline or coiled tubing configurations, power can be supplied downhole with a battery or via a downhole generator.

Disclosed herein are acoustic sensor systems and methods. The systems and methods may utilize an acoustic sensor that includes one or more components arranged linearly with respect to one another. Compared with alternative solutions, the acoustic sensor has a minimal, reduced radial distance and depth. As a result, the acoustic sensor can be located in a housing that may be received and seated in a collar having a 4.75" nominal diameter or another minimal diameter. In addition, the housing and/or collar may receive a force and may flex and bend up to twenty degrees without suffering detrimental effects on the fatigue strength of the housing and/or collar. The housing and collar also may bend a different number of degrees.

Other acoustic sensors require a larger radial footprint and typical forces on these other acoustic sensors and an associated housing cause fatigue, damage, and/or breakage to the housing and sensors. As a result, these acoustic sensors were not capable of being flexible and bending up to twenty degrees without suffering detrimental effects. By separating the acoustic sensor into discrete components and arranging the components side-by-side, a larger transducer may be used thereby facilitating image processing of data captured by the acoustic sensor. The redesigned acoustic sensor may be sized such that a number of sensors may be mounted or located within a 4.75" nominal diameter collar. This may allow the acoustic sensor to capture additional data and process the additional data to create a visual scan in a downhole environment. The linear arrangement of the subcomponents also may allow the sensor and the housing to have a shape that is optimal to reduce stress over alternative solutions.

The acoustic sensor system may have a number of acoustic sensors (e.g., four) and associated transducers that are sized such that it is capable of high-resolution data acquisition to generate high-resolution visual scans. Other devices are not capable of achieving the high-resolution visual scans provided by the acoustic sensors and the acoustic sensor system discussed herein.

In an example, the acoustic sensor may include a linear arrangement of one or more components that are housed in a housing. The one or more components may include an electrical connector, a transducer that is larger than alternative transducers, and a fluid compensating piston. The fluid compensating piston may be an oil compensating piston. By arranging the one or more components in a linear arrangement, a radial footprint of the acoustic sensor may be reduced. Any stress related to one or more bores in the collar may be mitigated through an elongated design of the acoustic sensor discussed herein. The elongated design may allow the acoustic sensor to be more flexible and better address stress such as bending and torque related loads. As a result, the acoustic sensor may perform under 20 G of vibration force and/or 1000 G of shock loads.

Figure 2:
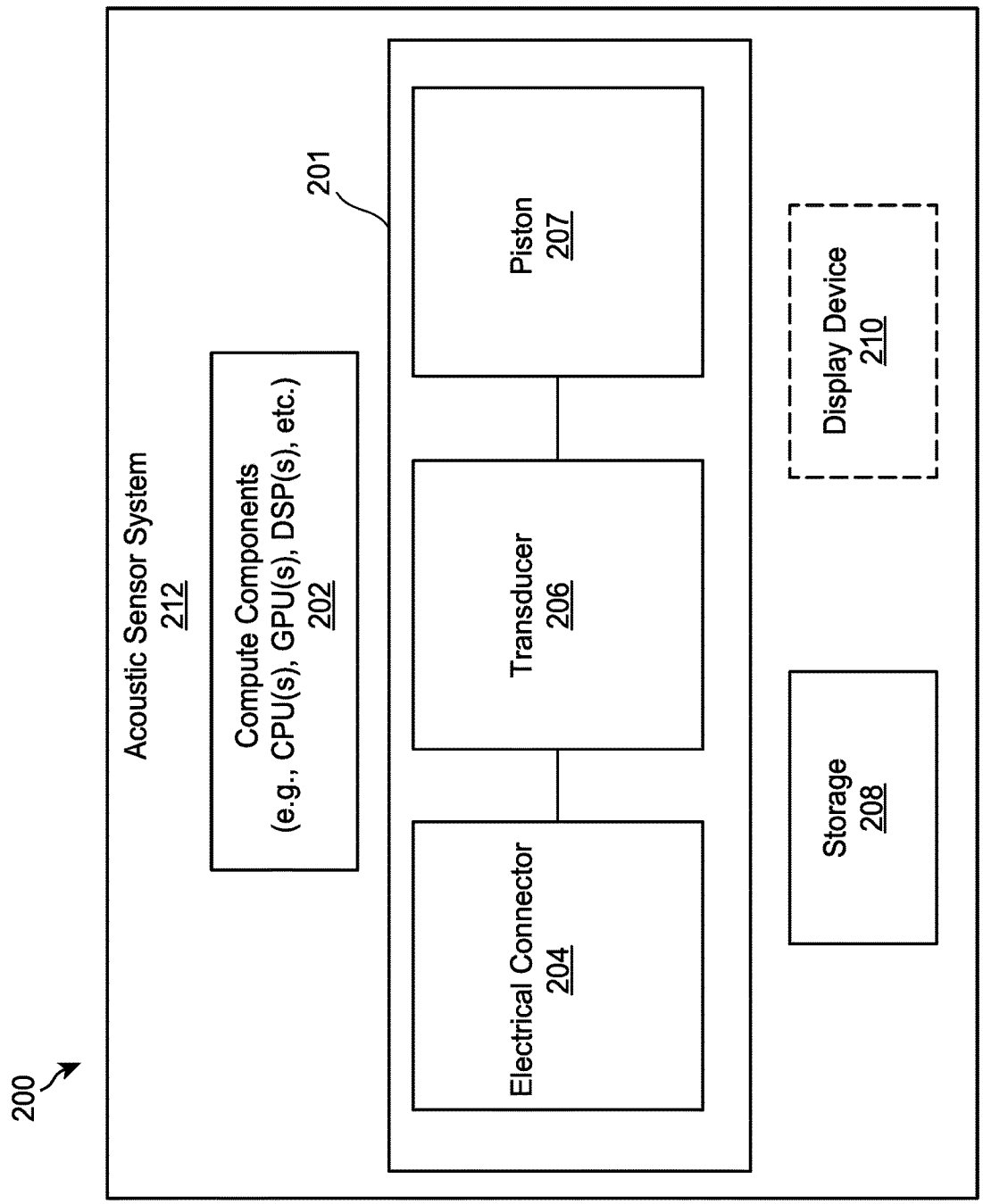
FIG. 2 is a block diagram of an acoustic sensor system, in accordance with some examples.

FIG. 2 illustrates an example acoustic sensor system 200. The acoustic sensor system 200 can be implemented for capturing a visual scan of a downhole environment as described herein. As noted above, the acoustic sensor system 200 may be located downhole and may communicate with another device located downhole and/or on the surface. In this example, the acoustic sensor system 200 can include one or more acoustic sensors 201.

Each acoustic sensor may include an electrical connector 204, a transducer 206, and a piston 207. The transducer 206 may be an electromagnetic acoustic transducer or another type of transducer that converts acoustic signals such as ultrasonic waves to electrical signals and converts electrical signals to acoustic signals. In one example, the transducer 206 may transmit the ultrasonic waves to obtain information about a surrounding environment. The transducer 206 may transmit the ultrasonic waves into the downhole environment to determine and characterize the downhole environment. The transducer 206 may use the ultrasonic waves to image and analyze the downhole environment. Thus, the transducer 206 may facilitate image processing of data captured by the acoustic sensor. The transducer 206 also may receive the data captured by the acoustic system and create a visual scan of a downhole environment. The piston 207 may be a fluid or oil compensating piston.

The acoustic sensor 201 shown in FIG. 2 includes these discrete components that are linearly arranged and connected with one another. In addition, the acoustic sensor system 200 may include optional compute components 202 and an optional storage 208. In some implementations, the acoustic sensor system 200 can also include a display device 210 for displaying data and graphical elements such as images, videos, text, simulations, and any other media or data content.

The acoustic sensor system 200 can be part of, or implemented by, one or more computing devices, such as one or more servers, one or more personal computers, one or more processors, one or more mobile devices (e.g., a smartphone, a camera, a laptop computer, a tablet computer, a smart device, etc.), and/or any other suitable electronic device. In some cases, the one or more computing devices that include or implement the acoustic sensor system 200 can include one or more hardware components such as, for example, one or more wireless transceivers, one or more input devices, one or more output devices (e.g., display device 210), one or more sensors (e.g., an image sensor, a temperature sensor, a pressure sensor, an altitude sensor, a proximity sensor, an inertial measurement unit, etc.), one or more storage devices (e.g., storage system 208), one or more processing devices (e.g., compute components 202), etc.

As previously mentioned, the acoustic sensor system 200 can include compute components 202. The compute components can be used to implement modules executed by the acoustic sensor system 200, and/or any other computing component. The compute components 202 can also be used to control, communicate with, and/or interact with the storage 208 and/or the display device 210. The compute components 202 can include electronic circuits and/or other electronic hardware, such as, for example and without limitation, one or more programmable electronic circuits. For example, the compute components 202 can include one or more microprocessors, one or more graphics processing units (GPUs), one or more digital signal processors (DSPs), one or more central processing units (CPUs), one or more image signal processors (ISPs), and/or any other suitable electronic circuits and/or hardware. Moreover, the compute components 202 can include and/or can be implemented using computer software, firmware, or any combination thereof, to perform the various operations described herein.

The electrical connector 204 may be connected to the transducer 206 and also may be connected to the piston 207. The piston 207 may be a liquid compensating piston that may be an oil compensating piston. Each acoustic sensor 201 of the acoustic sensor system 200 can capture a visual scan in a downhole environment as discussed in reference to method 1400.

The storage 208 can be any storage device(s) for storing data such as the imaging data captured by the transducer 206. In some examples, the storage 208 can include a buffer or cache for storing data for processing by the compute components 202. Moreover, the storage 208 can store data from any of the components of the acoustic sensor system 200. For example, the storage 208 can store input data used by the acoustic sensor system 200, outputs or results generated by the acoustic sensor system 200 (e.g., data and/or calculations from the transducer 206, etc.), user preferences, parameters and configurations, data logs, documents, software, media items, GUI content, and/or any other data and content.

The acoustic sensor 201 having the electrical connector 204, the transducer 206, and the piston 207 are linearly arranged in a housing 212. The housing 212 may be seated in a titanium collar that has a 4.75 inch nominal diameter. By having this arrangement, the housing 212 can be subjected to a force and bend up to twenty degrees or a different amount. The collar also may have a different diameter such as 6.75 inches, 8 inches, and 9.5 inches, among others.

While the acoustic sensor system 200 is shown in FIG. 2 to include certain components, one of ordinary skill in the art will appreciate that the acoustic sensor system 200 can include more or fewer components than those shown in FIG. 2. For example, the acoustic sensor system 200 can also include one or more memory components (e.g., one or more RAMs, ROMs, caches, buffers, and/or the like), one or more input components, one or more output components, one or more processing devices, and/or one or more hardware components that are not shown in FIG. 2.

Figure 3:
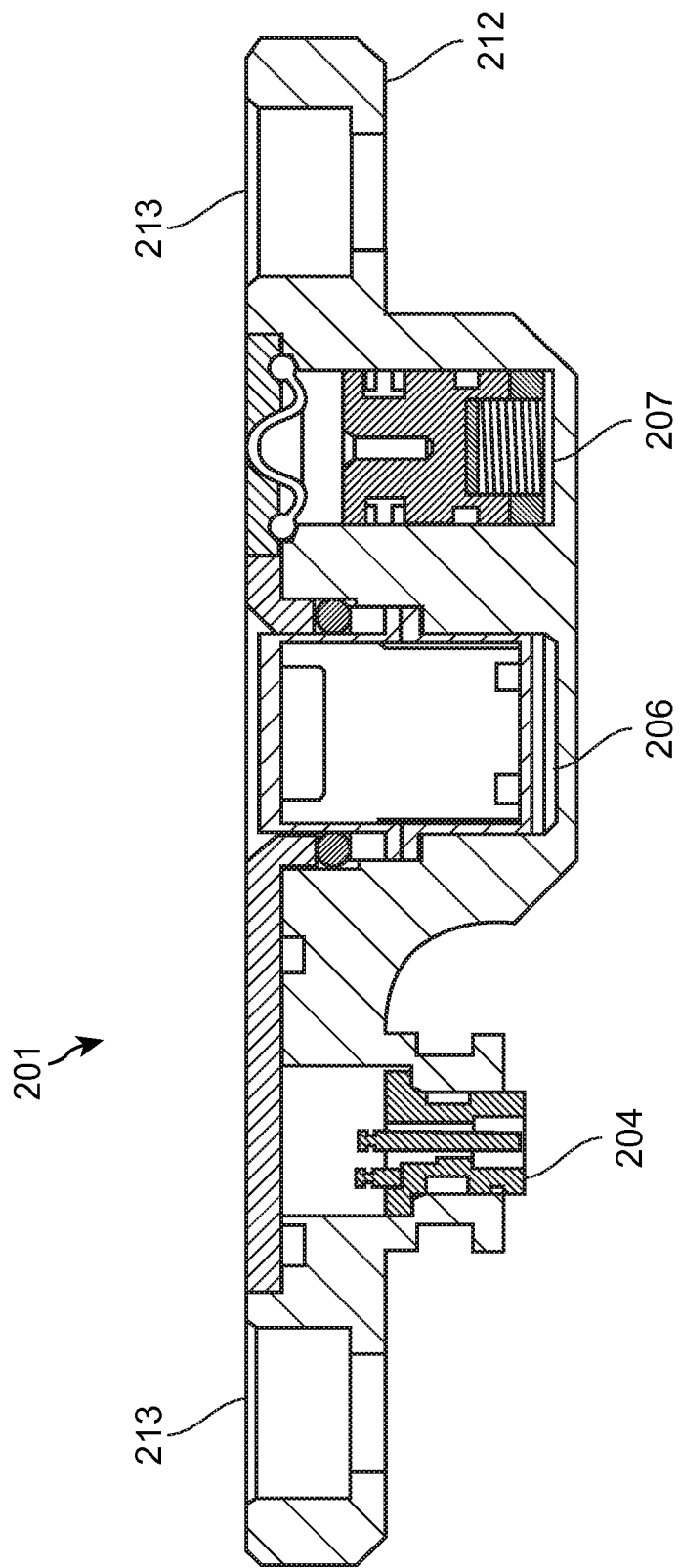
FIG. 3 is a cutaway view of an acoustic sensor of the acoustic sensor system, in accordance with some examples.

FIG. 3 illustrates a two-dimensional cutaway view of an acoustic sensor 201 of the acoustic sensor system 200 according to an example. The acoustic sensor system 200 may include one or more of the acoustic sensors 201 shown in FIG. 3. The acoustic sensor 201 may be arranged as shown in FIG. 3 or may be arranged in another manner.

As shown in FIG. 3, the electrical connector 204 is located in a left-most position in the housing 212 and is in connection with the transducer 206, which is in the middle of the three discrete components. The electrical connector 204 is also connected to the piston 207, which is located in a right-most position in the housing 212. FIG. 3 also illustrates two holes 213 where bolts, screws, or other fasteners may be configured to connect the acoustic sensor 201 to other components in the wellbore in the downhole environment.

Figure 4:
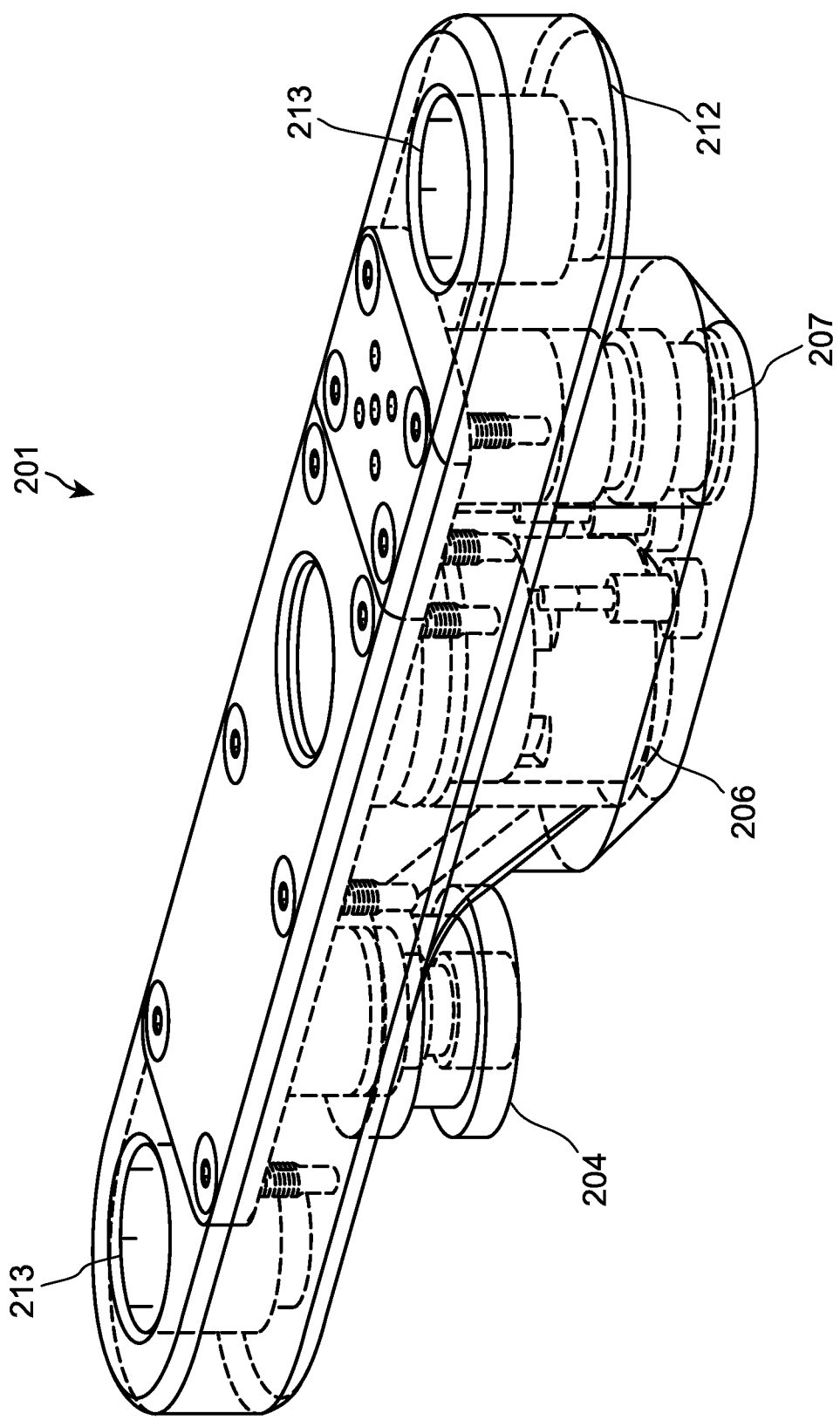
FIG. 4 is an isometric view of an acoustic sensor of the acoustic sensor system, in accordance with some examples.

FIG. 4 illustrates a three-dimensional isometric view of the acoustic sensor 201 of the acoustic sensor system 200 according to an example. The acoustic sensor 201 may be arranged as shown in FIG. 4 or may be arranged in another manner. As shown in FIG. 4, the electrical connector 204 is located in a left-most position in the housing 212 and is in connection with the transducer 206, which is in the middle of the three discrete components. The electrical connector 204 is also connected to the piston 207, which is located in a right-most position in the housing 212. FIG. 4 also illustrates two holes 213 that connect the acoustic sensor 201 to other components in the wellbore in the downhole environment.

Figure 5:
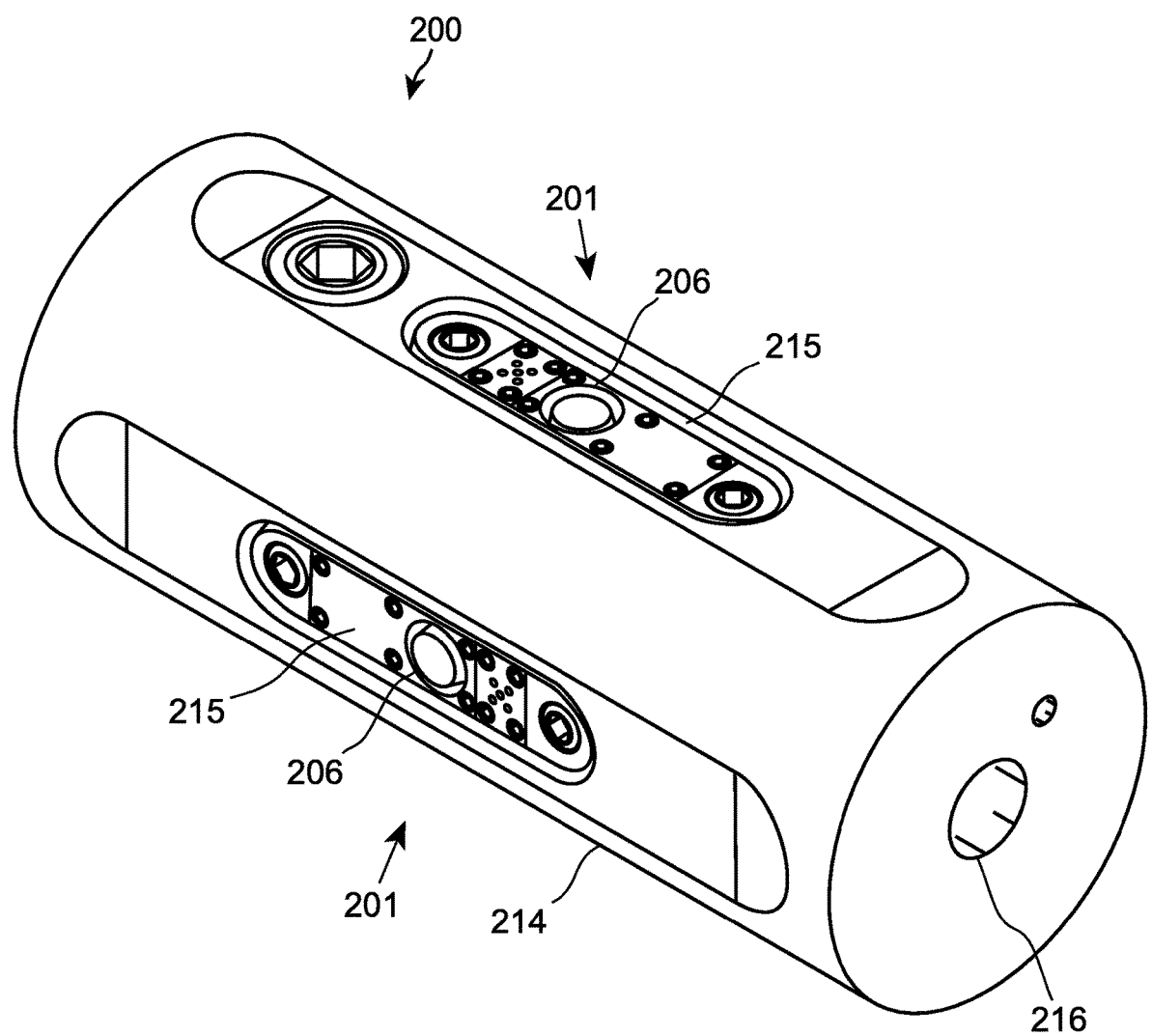
FIG. 5 is an isometric view of an acoustic sensor system and a corresponding collar, in accordance with some examples.

FIG. 5 illustrates an isometric view of an acoustic sensor system 200 and a corresponding collar 214 according to an example. As shown in FIG. 5, some aspects of two acoustic sensors 201 are visible in FIG. 5 including the transducer 206 associated with each acoustic sensor 201 and some portions of the housing 212. In addition, FIG. 5 illustrates a collar 214 that receives, contains, and includes one or more acoustic sensors 201. The collar 214 can have a cylindrical shape to receive the housing 212 mounted along the interior surface of the collar and include a bore 216 or cavity in a center of the cylindrical shape, the bore being parallel to the housing 212 mounted along the interior surface of the collar 214. The bore 216 may allow fluid to continually pass through the collar 214.

As shown in FIG. 5, the collar 214 can have a generally cylindrical shape and each acoustic sensor 201 may be arranged along one surface of the collar 214. In one example, the collar 214 may have four interior surfaces and four exterior surfaces and each exterior surface may have an aperture 215 that allows the transducer 206 to capture data associated with a visual scan of the downhole environment. In FIG. 5, two of the four exterior surfaces are visible and two of the four acoustic sensors 201 of the acoustic sensor system 200 are visible through the apertures 215. In addition, FIG. 5 shows the bore 216 that is located in a center of the cylindrical collar 214.

In other words, the collar 214 can have a cylindrical shape to receive the first housing 212 mounted along the first interior surface of the collar 214, the second housing 212 mounted along the second interior surface of the collar 214, the third housing 212 mounted along the third interior surface of the collar 214, and the fourth housing 212 mounted along the fourth interior surface of the collar 214. The collar 214 further includes the bore 216 in a center of the cylindrical shape, the bore 216 being parallel to the first housing 212 mounted along the first interior surface of the collar 214, the second housing 212 mounted along the second interior surface of the collar 214, the third housing 212 mounted along the third interior surface of the collar 214, and the fourth housing 212 mounted along the fourth interior surface of the collar 214.

In another example, the collar 214 may have fewer than four housings 212 mounted along interior surfaces of the collar 214 (e.g., one or two) or may have more than four housings 212 mounted along interior surfaces of the collar 214 (e.g., six, eight, or more). The collar 214 may have an even number of housings 212 and may have an odd number of housings 212. Additionally, the housings 212 may be mounted to the interior surfaces of the collar 214 or may be mounted to the collar 214 in another way.

Each of the housings 212 in the collar 214 may be protected by the collar and expose each associated transducer 206 to allow the transducers to capture data associated with the downhole environment. The collar 214 can have a first aperture 215 to the wellbore allowing the first transducer 206 to capture a visual scan of a downhole environment, a second aperture 215 to the wellbore allowing the second transducer 206 to capture the visual scan of the downhole environment, a third aperture 215 to the wellbore allowing the third transducer 206 to capture the visual scan of the downhole environment, and a fourth aperture 215 allowing the fourth transducer 206 to capture the visual scan of the downhole environment. Each aperture 215 may expose the transducer 206 and possibly other components of the acoustic sensor 201.

The first transducer, the second transducer, the third transducer, and the fourth transducer may simultaneously capture different visual scans of the downhole environment and the acoustic sensor system 200 may combine the different visual scans together into one combined high-resolution visual scan. Each aperture 215 may be located a particular distance from an end of the transducer 206 such that the transducer is able to capture the data that is exterior from the collar 214. One end of the transducer 206 may be exposed to the downhole environment via an opening, cavity, or hole such as a circular opening. The opening may face the aperture 215 and another end of the transducer 206 may face the interior of the collar 214.

Figure 6:
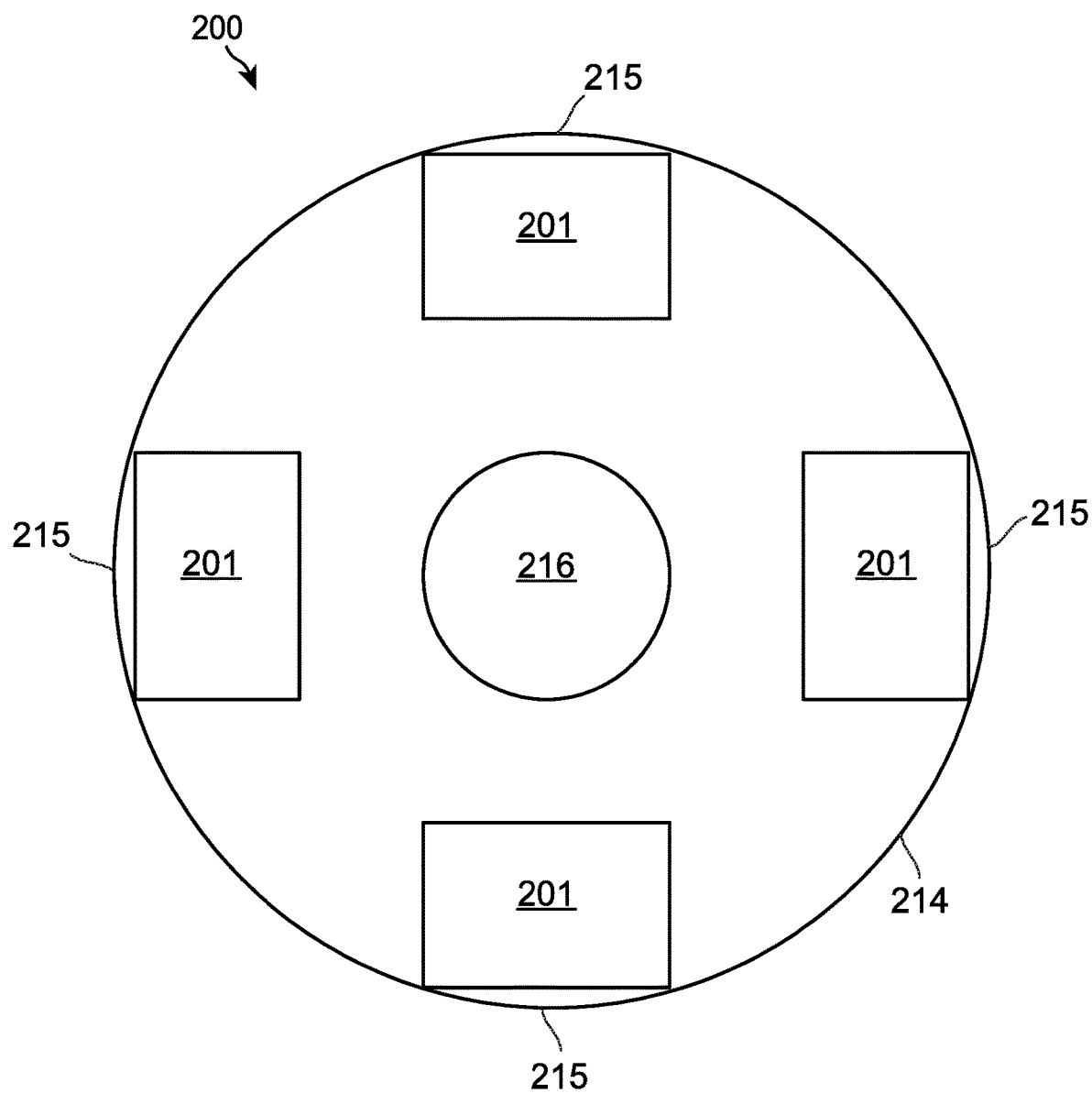
FIG. 6 is a cutaway block diagram of an acoustic sensor system and a corresponding collar, in accordance with some examples.

FIG. 6 illustrates a two-dimensional cutaway block diagram of an acoustic sensor system 200 and a corresponding collar 214 according to an example. As shown in FIG. 6, the acoustic sensor system 200 may include one or more acoustic sensors 201 including a first acoustic sensor 201, a second acoustic sensor 201, a third acoustic sensor 201, and a fourth acoustic sensor 201. The one or more acoustic sensors 201 may be mounted and arranged along interior surfaces of the collar 214 such that each acoustic sensor 201 is located near an aperture.

The first acoustic sensor 201 may be coupled to the housing 212 and located along a first interior surface of the collar 214. The second acoustic sensor 201 may be coupled to the housing 212 and located along a second interior surface of the collar 214. The third acoustic sensor 201 may be coupled to the housing 212 and located along a third interior surface of the collar 214. The third interior surface of the collar 214 may be parallel with the first interior surface of the collar 214. The fourth acoustic sensor 201 may be coupled to the housing 212 and located along a fourth interior surface of the collar 214. The fourth interior surface of the collar 214 may be parallel with the second interior surface of the collar 214.

The collar 214 may be located in the downhole environment, fully surrounded by hydraulic fluid and oil and subject to great amounts of pressure such as 30,000 pounds per square inch (PSI) of pressure. In addition, the collar 214 and the associated acoustic sensors 201 may be continually rotating, spinning, and moving in the wellbore of the downhole environment. The housing 212 and each of the associated acoustic sensors 201 may flex and bend under the forces and pressure such that they may handle up to 20 G of vibration and 1000 G of shock loads.

Figure 7:
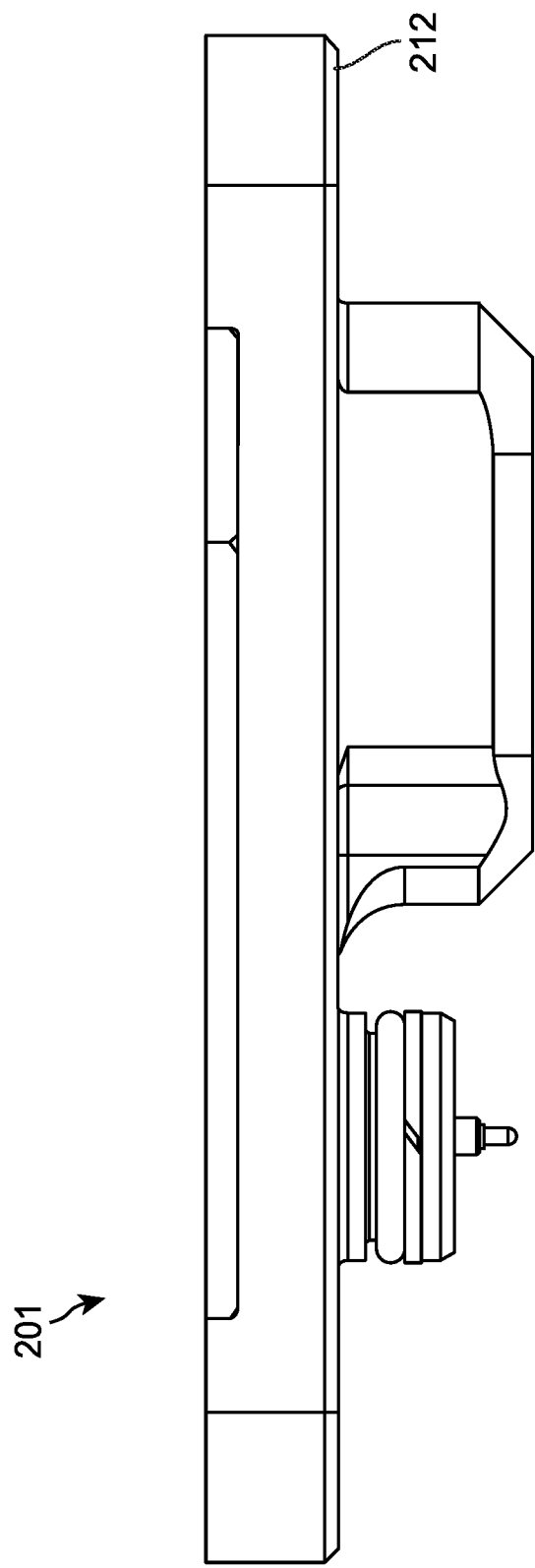
FIG. 7 is a side view of an acoustic sensor of the acoustic sensor system, in accordance with some examples.

FIG. 7 illustrates a side view of the acoustic sensor 201 of the acoustic sensor system 200 according to an example. The housing 212 and corresponding collar 214 are both machinable using traditional machining processes.

Figure 8:
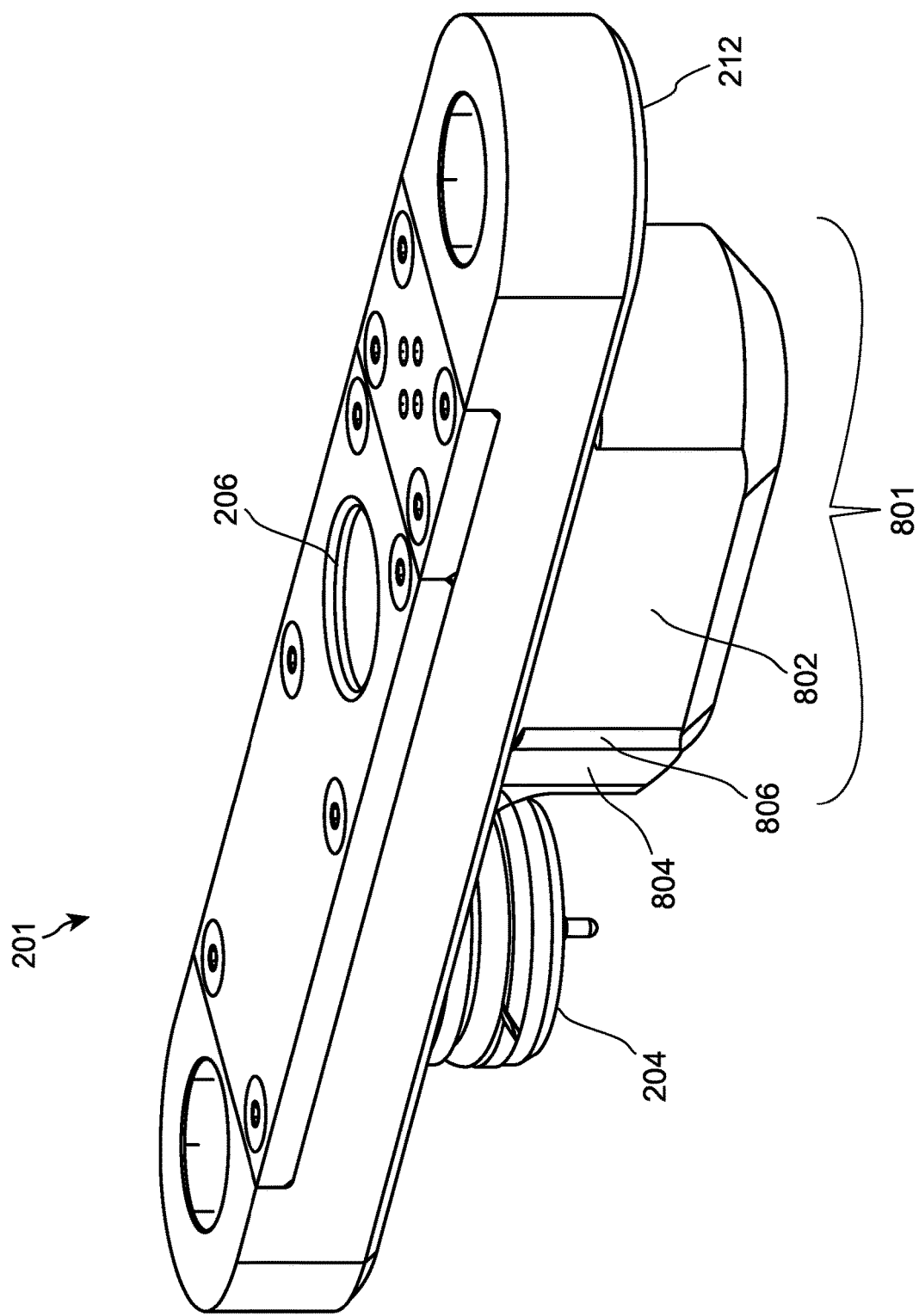
FIG. 8 is an isometric view of an acoustic sensor of the acoustic sensor system, in accordance with some examples.

FIG. 8 is an isometric view of the acoustic sensor 201 of the acoustic sensor system 200 according to an example. FIG. 8 shows that the housing 212 has a section 801 that optimally locates and protects internal components of the acoustic sensor 201 including the transducer 206 and the piston 207. Section 801 also enables the housing 212 to be optimally manufacturable. The section 801 includes a first surface 802 that is coupled with a second surface 804 via a connector surface 806. The first surface 802, the second surface 804, and the connector surface 806 may alleviate stress that is applied to the housing 212 and reduce the risk of damage to the acoustic sensor 201 including the transducer 206 and the piston 207 within.

Figure 9:
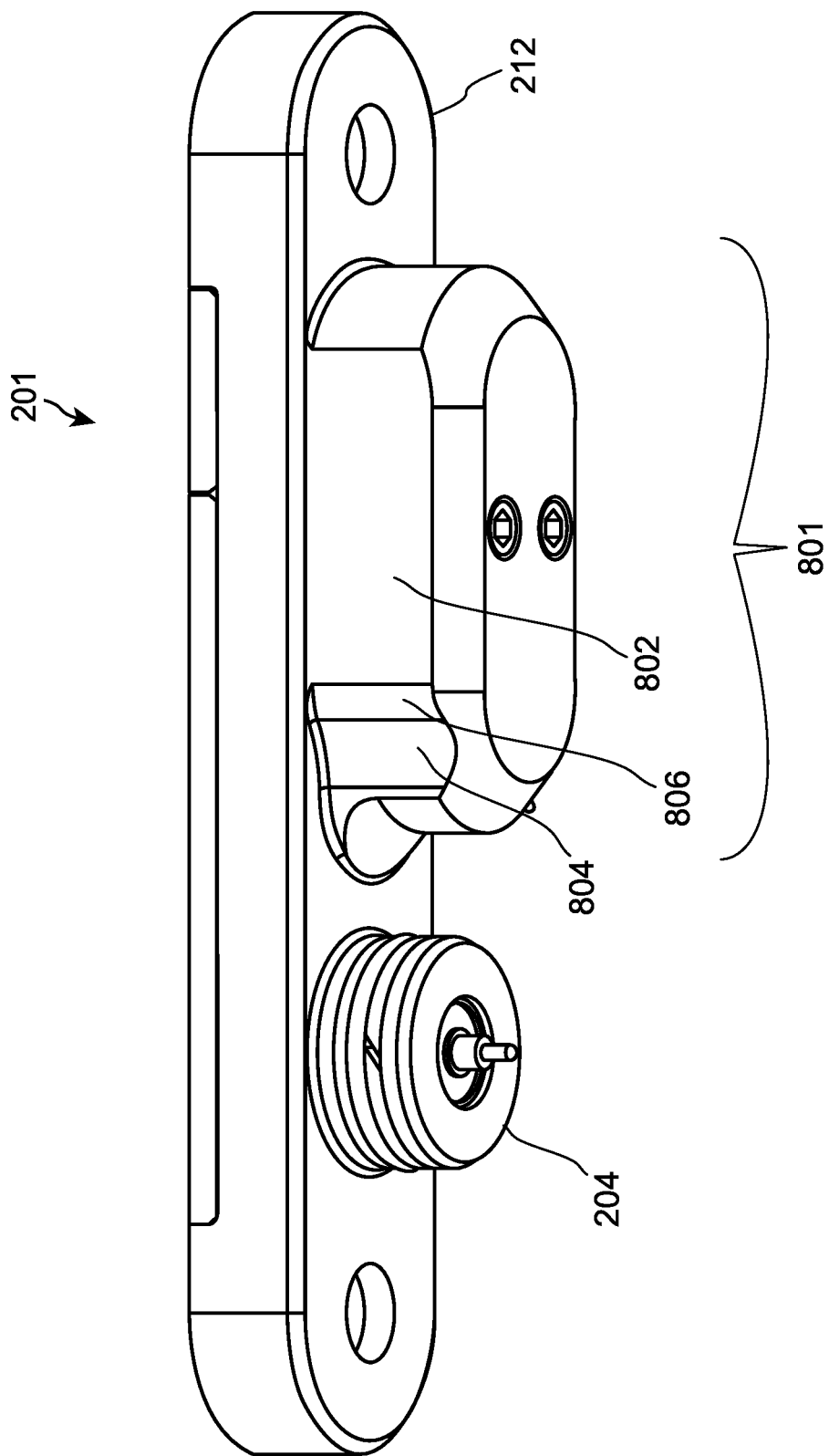
FIG. 9 is an isometric view of an acoustic sensor of the acoustic sensor system, in accordance with some examples.

FIG. 9 is another isometric view of the acoustic sensor 201 of the acoustic sensor system 200 according to an example. This view shows the section 801 of the acoustic sensor 201 that is held and protected within the collar 214 including the transducer 206 and the piston 207.

Figure 10:
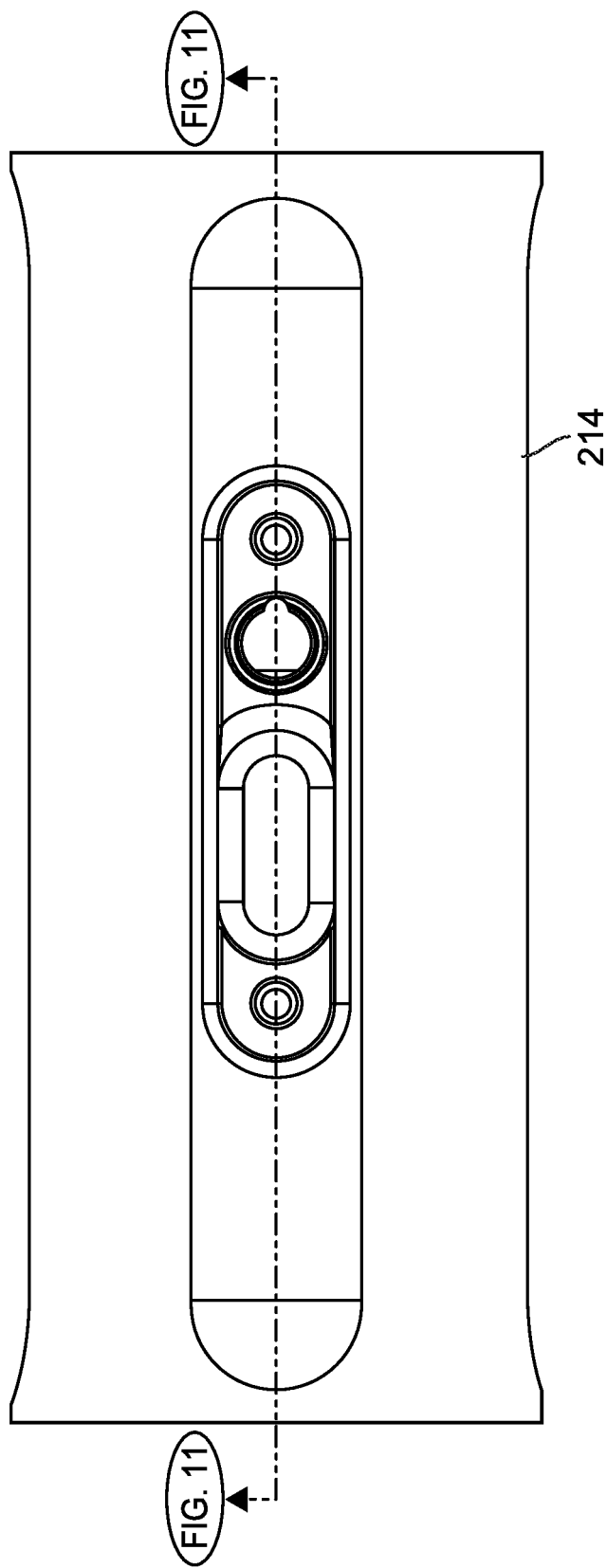
FIG. 10 shows a view of the collar of the acoustic sensor system, in accordance with some examples.

FIG. 10 is a view of the collar 214 according to an example. FIG. 10 shows an opening or pocket of the collar 214 that receives the acoustic sensor 201.

Figure 11:
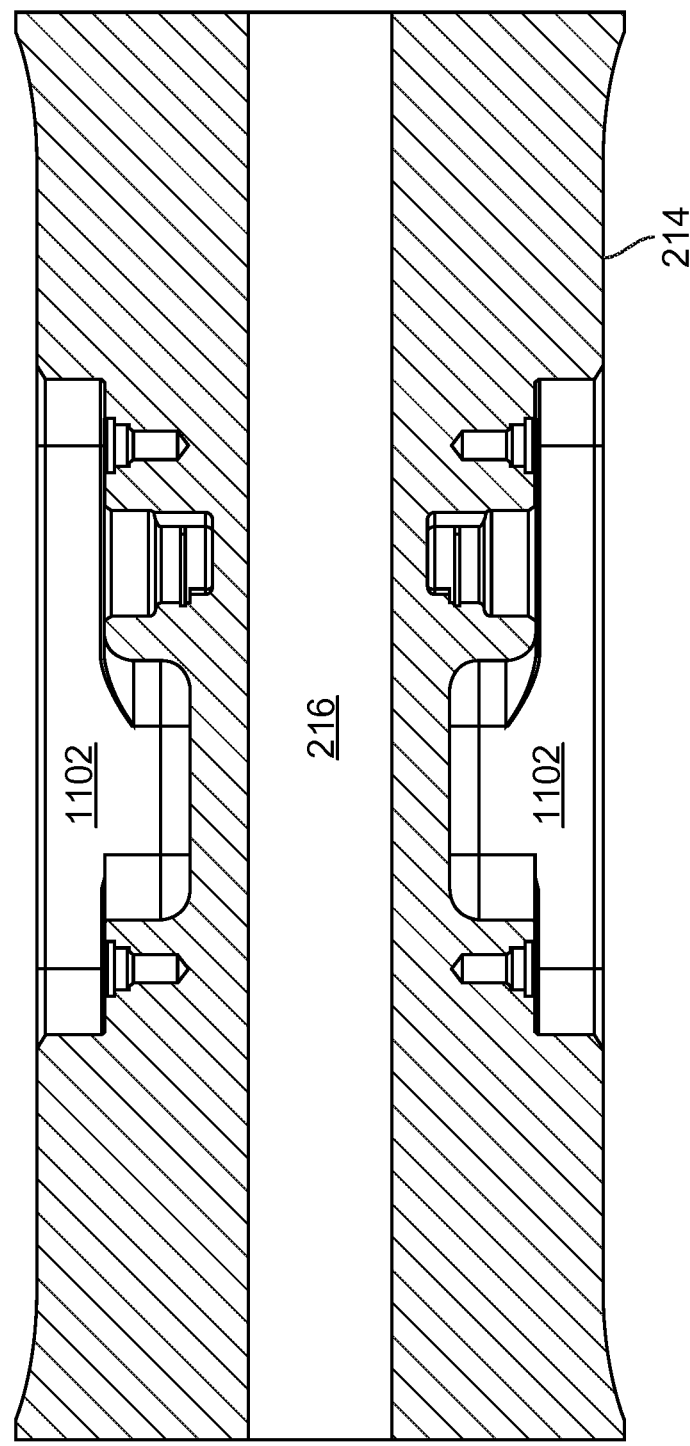
FIG. 11 shows a cross-section view of the collar of the acoustic sensor system, in accordance with some examples.

FIG. 11 is a cross-section view of the collar 214 according to an example. FIG. 11 shows an opening or pocket 1102 of the collar 214 that receives the acoustic sensor 201 and the bore 216 that is in the center of the collar 214. The section 801 of the housing 212 having first surface 802, the second surface 804, and the connector surface 806 is received by the pocket 1102 that has a corresponding shape to enable structural integrity and machinability of the collar 214, thereby making the collar 214 capable of surviving harsh operating conditions.

Figure 12:
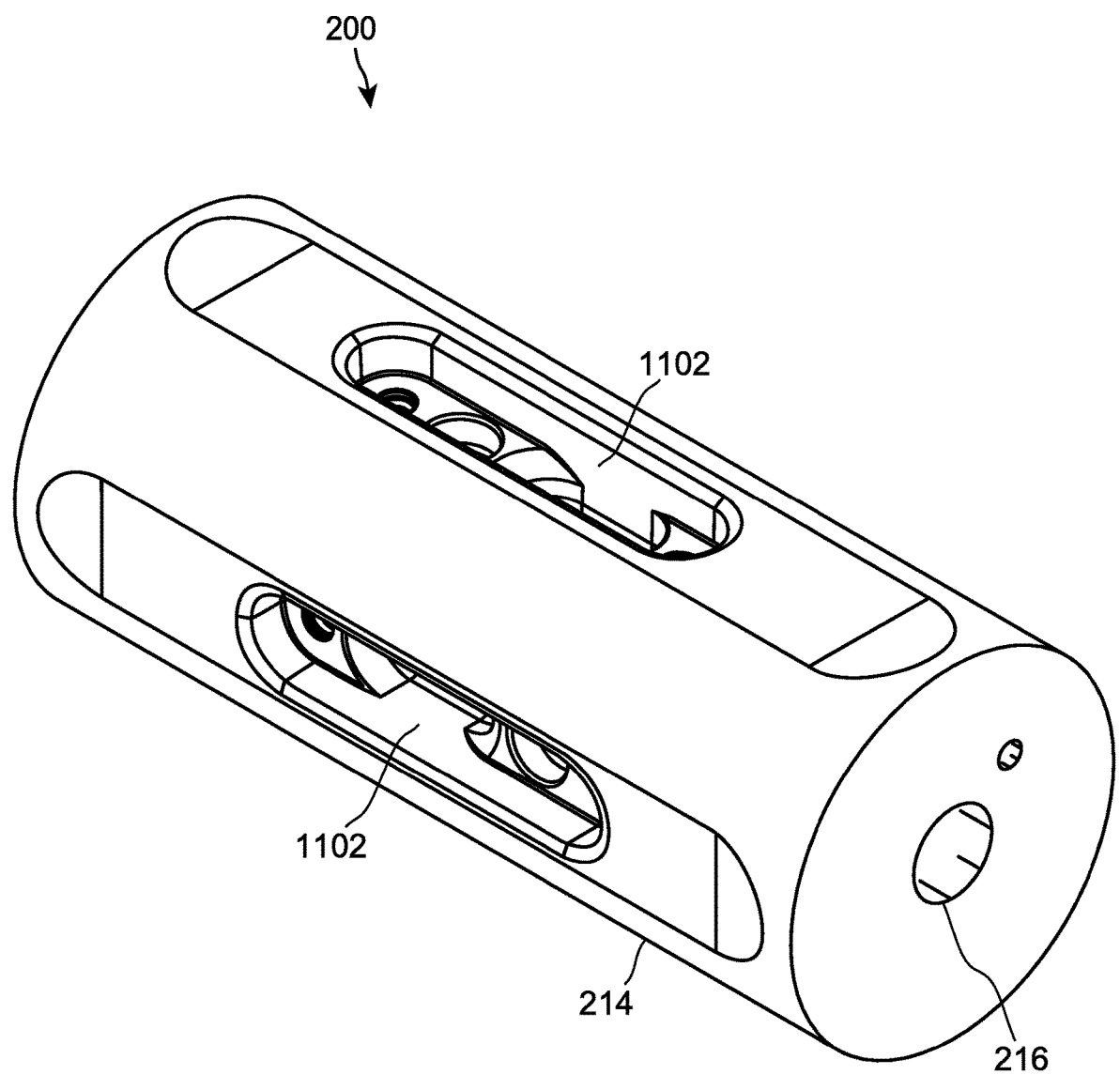
FIG. 12 shows an isometric view of the collar of the acoustic sensor system, in accordance with some examples.

FIG. 12 is an isometric view of the collar 214 of the acoustic sensor system 200 according to an example. FIG. 12 shows the opening or pocket 1102 of the collar 214 that receives the acoustic sensor 201, such that the transducer 206 is a distance away from the exterior of the collar 214. The pocket 1102 provides benefits for the visual scan of the downhole environment and protects the acoustic sensor 201 and its electrical connector 204, transducer 206, and piston 207.

Figure 13:
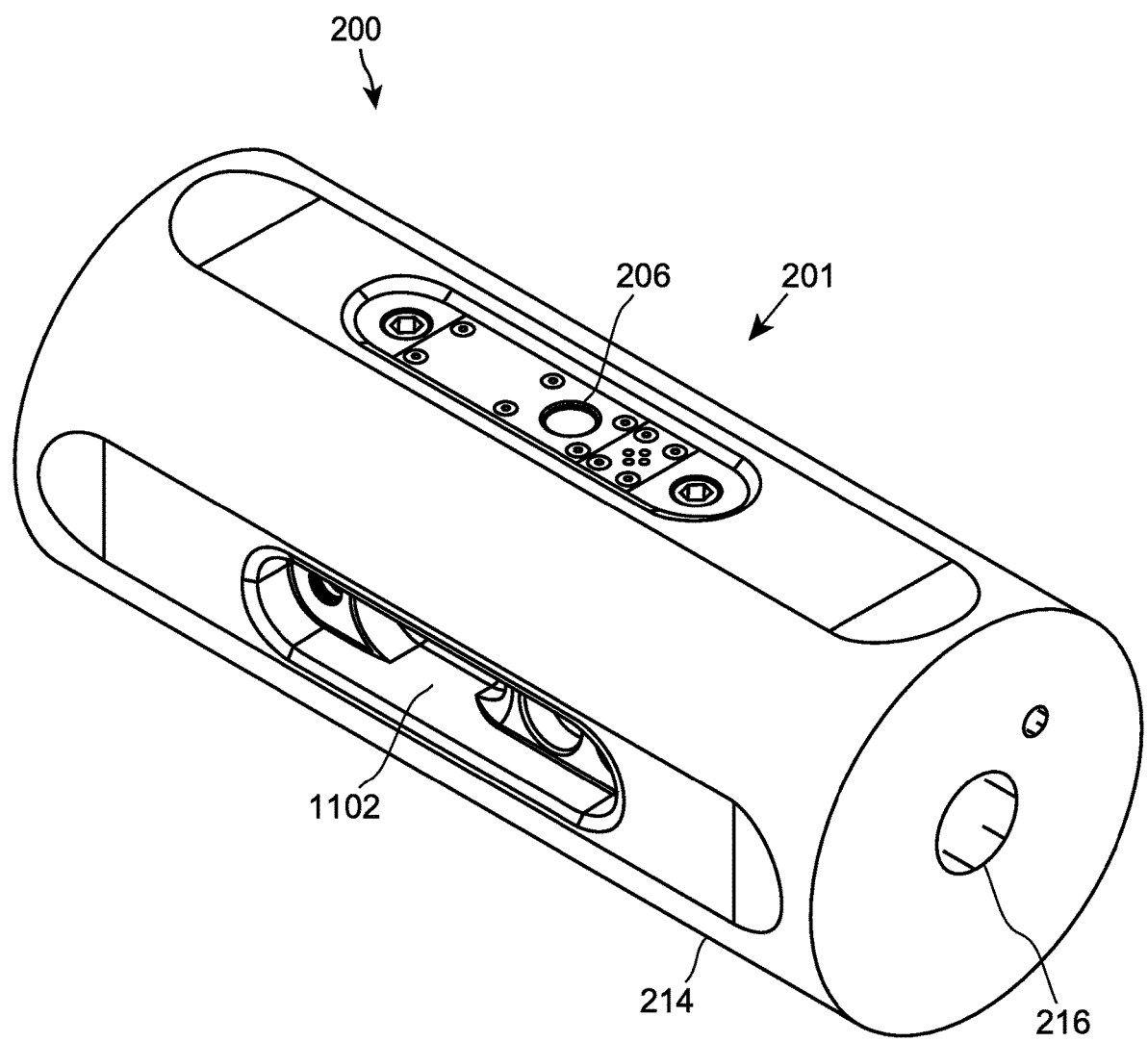
FIG. 13 shows an isometric view of an acoustic sensor of the acoustic sensor system and the collar of the acoustic sensor system, in accordance with some examples.

FIG. 13 is an isometric view of an acoustic sensor 201 of the acoustic sensor system 200 and the collar 214 of the acoustic sensor system 200 according to an example. FIG. 13 shows the opening or pocket 1102 of the collar 214 that receives the acoustic sensor 201 and also shows the acoustic sensor 201 that is received in the opening or pocket 1102.

Having disclosed some example system components and concepts, the disclosure now turns to FIG. 14, which illustrates an example method 1400 for capturing image data by at least one acoustic sensor 201. For the sake of clarity, the method 1400 is described in terms of the acoustic sensor system 200, as shown in FIG. 2, configured to practice the method. The steps outlined herein are exemplary and can be implemented in any combination thereof, including combinations that exclude, add, or modify certain steps.

At step 1402, a first acoustic sensor 201 of the acoustic sensor system 200 can capture a first visual scan of a downhole environment. At step 1404, a second acoustic sensor 201 of the acoustic sensor system 200 can capture a second visual scan of the downhole environment. At step 1406, a third acoustic sensor 201 of the acoustic sensor system 200 can capture a third visual scan of the downhole environment. At step 1408, a fourth acoustic sensor 201 of the acoustic sensor system 200 can capture a fourth visual scan of the downhole environment. At step 1410, the acoustic sensor system 200 can combine the first visual scan of the downhole environment, the second visual scan of the downhole environment, the third visual scan of the downhole environment, and the fourth visual scan of the downhole environment into a combined visual scan of the downhole environment. The first visual scan, the second visual scan, the third visual scan, and the fourth visual scan may be combined into a high-resolution visual scan of the downhole environment.

The combination of the first visual scan of the downhole environment, the second visual scan of the downhole environment, the third visual scan of the downhole environment, and the fourth visual scan of the downhole environment may be simultaneously captured and each represent a different view of the downhole environment. The combined high-resolution scan of the downhole environment can be transmitted to a computing device. The computing device may be located downhole and/or on the surface.

As noted herein, the first acoustic sensor 201 can be mounted along a first interior surface of a housing, the second acoustic sensor 201 can be mounted along a second interior surface of a housing, the third acoustic sensor 201 can be mounted along a third interior surface of the housing opposite the first interior surface of the housing, and the fourth acoustic sensor 201 can be mounted along a fourth interior surface of the housing opposite the second interior surface of the housing. In addition, the collar 214, each housing 212, and each acoustic sensor 201 may be rotating and spinning in the downhole environment.

In other words, the acoustic sensor system 200 may include a first electrical connector 204, a second electrical connector 204, a third electrical connector 204, and a fourth electrical connector 204. The acoustic sensor system 200 can further include a first transducer 206 connected to the first electrical connector 204, a second transducer 206 connected to the second electrical connector 204, a third transducer 206 connected to the third electrical connector 204, and a fourth transducer 206 connected to the fourth electrical connector 204. The acoustic sensor system 200 can include a first fluid compensating piston 207 connected to the first electrical connector 204, a second fluid compensating piston 207 connected to the second electrical connector 204, a third fluid compensating piston 207 connected to the third electrical connector 204, and a fourth fluid compensating piston 207 connected to the fourth electrical connector 204.

The acoustic sensor system 200 can have a first housing 212 having the first electrical connector 204, the first transducer 206, and the first fluid compensating piston 207 arranged in a linear arrangement, a second housing 212 having the second electrical connector 204, the second transducer 206, and the second fluid compensating piston 207 arranged in the linear arrangement, a third housing 212 having the third electrical connector 204, the third transducer 206, and the third fluid compensating piston 207 arranged in the linear arrangement, and a fourth housing 212 having the fourth electrical connector 204, the fourth transducer 206, and the fourth fluid compensating piston 207 arranged in the linear arrangement. The acoustic sensor system may have a collar 214 having the first housing 212 mounted along a first interior surface of the collar, the second housing 212 mounted along a second interior surface of the collar, the third housing 212 mounted along a third interior surface of the collar opposite the first interior surface of the collar 214, and the fourth housing 212 mounted along a fourth interior surface of the collar opposite the second interior surface of the collar 214.

In addition, the first transducer 206, the second transducer 206, the third transducer 206, and the fourth transducer 206 together can facilitate image processing of data captured by the acoustic sensor system 200. This can allow the first transducer 206, the second transducer 206, the third transducer 206, and the fourth transducer 206 to receive the data captured by the acoustic system and create a visual scan of the downhole environment. In one example, the collar 214 can have a cylindrical shape to receive the first housing 212 mounted along the interior first interior surface of the collar 214, the second housing 212 mounted along the second interior surface of the collar 214, the third housing 212 mounted along the third interior surface of the collar 214, and the fourth housing 212 mounted along the fourth interior surface of the collar 214. The collar 214 includes the bore 216 in a center of the cylindrical shape. In this way, the bore 216 can be parallel to the first housing 212 mounted along the first interior surface of the collar 214, the second housing 212 mounted along the second interior surface of the collar 214, the third housing 212 mounted along the third interior surface of the collar 214, and the fourth housing 212 mounted along the fourth interior surface of the collar 214.

In addition, the collar 214 can have a first aperture 215 to the wellbore allowing the first transducer 206 to capture a visual scan of a downhole environment, a second aperture 215 to the wellbore allowing the second transducer 206 to capture the visual scan of the downhole environment, a third aperture 215 to the wellbore allowing the third transducer 206 to capture the visual scan of the downhole environment, and a fourth aperture 215 allowing the fourth transducer 206 to capture the visual scan of the downhole environment.

Having disclosed example systems, methods, and technologies for capturing a visual scan of a downhole environment by at least one acoustic sensor, the disclosure now turns to FIG. 15, which illustrates an example computing device architecture 1500 which can be employed to perform various steps, methods, and techniques disclosed herein. The various implementations will be apparent to those of ordinary skill in the art when practicing the present technology. Persons of ordinary skill in the art will also readily appreciate that other system implementations or examples are possible.

As noted above, FIG. 15 illustrates an example computing device architecture 1500 of a computing device that can implement the various technologies and techniques described herein. For example, the computing device architecture 1500 can implement the system 200 shown in FIG. 2 and perform various steps, methods, and techniques disclosed herein. The components of the computing device architecture 1500 are shown in electrical communication with each other using a connection 1505, such as a bus. The example computing device architecture 1500 includes a processing unit (CPU or processor) 1510 and a computing device connection 1505 that couples various computing device components including the computing device memory 1515, such as read only memory (ROM) 1520 and random access memory (RAM) 1525, to the processor 1510.

The computing device architecture 1500 can include a cache of high-speed memory connected directly with, in close proximity to, or integrated as part of the processor 1510. The computing device architecture 1500 can copy data from the memory 1515 and/or the storage device 1530 to the cache 1512 for quick access by the processor 1510. In this way, the cache can provide a performance boost that avoids processor 1510 delays while waiting for data. These and other modules can control or be configured to control the processor 1510 to perform various actions. Other computing device memory 1515 may be available for use as well. The memory 1515 can include multiple different types of memory with different performance characteristics. The processor 1510 can include any general purpose processor and a hardware or software service, such as service 1 1532, service 2 1534, and service 3 1536 stored in storage device 1530, configured to control the processor 1510 as well as a special-purpose processor where software instructions are incorporated into the processor design. The processor 1510 may be a self-contained system, containing multiple cores or processors, a bus, memory controller, cache, etc. A multi-core processor may be symmetric or asymmetric.

To enable user interaction with the computing device architecture 1500, an input device 1545 can represent any number of input mechanisms, such as a microphone for speech, a touch-sensitive screen for gesture or graphical input, keyboard, mouse, motion input, speech and so forth. An output device 1535 can also be one or more of a number of output mechanisms known to those of skill in the art, such as a display, projector, television, speaker device, etc. In some instances, multimodal computing devices can enable a user to provide multiple types of input to communicate with the computing device architecture 1500. The communications interface 1540 can generally govern and manage the user input and computing device output. There is no restriction on operating on any particular hardware arrangement and therefore the basic features here may easily be substituted for improved hardware or firmware arrangements as they are developed.

Storage device 1530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1525, read only memory (ROM) 1520, and hybrids thereof. The storage device 1530 can include services 1532, 1534, 1536 for controlling the processor 1510. Other hardware or software modules are contemplated. The storage device 1530 can be connected to the computing device connection 1505. In one aspect, a hardware module that performs a particular function can include the software component stored in a computer-readable medium in connection with the necessary hardware components, such as the processor 1510, connection 1505, output device 1535, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can include hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the disclosed concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the method, algorithms, and/or operations described above. The computer-readable data storage medium may form part of a computer program product, which may include packaging materials.

The computer-readable medium may include memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

In the above description, terms such as "upper," "upward," "lower," "downward," "above," "below," "downhole," "uphole," "longitudinal," "lateral," and the like, as used herein, shall mean in relation to the bottom or furthest extent of the surrounding wellbore even though the wellbore or portions of it may be deviated or horizontal. Correspondingly, the transverse, axial, lateral, longitudinal, radial, etc., orientations shall mean orientations relative to the orientation of the wellbore or tool. Additionally, the illustrate embodiments are illustrated such that the orientation is such that the right-hand side is downhole compared to the left-hand side.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicate that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder.

The term "radially" means substantially in a direction along a radius of the object, or having a directional component in a direction along a radius of the object, even if the object is not exactly circular or cylindrical. The term "axially" means substantially along a direction of the axis of the object. If not specified, the term axially is such that it refers to the longer axis of the object.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. The described features and steps are disclosed as possible components of systems and methods within the scope of the appended claims.

Moreover, claim language reciting "at least one of" a set indicates that one member of the set or multiple members of the set satisfy the claim. For example, claim language reciting "at least one of A and B" means A, B, or A and B.

Statements of the disclosure include:

Statement 1: An acoustic system comprises an electrical connector, at least one transducer connected to the electrical connector, a fluid compensating piston connected to the electrical connector, a housing having the electrical connector, the at least one transducer, and the fluid compensating piston arranged in a linear arrangement, and a collar having the housing mounted along an interior surface of the collar.

Statement 2: An acoustic system according to Statement 1, wherein the transducer facilitates image processing of data captured by the acoustic system.

Statement 3: An acoustic system according to Statements 1 and 2, wherein the transducer receives the data captured by the acoustic system and creates a visual scan of a downhole environment.

Statement 4: An acoustic system according to Statements 1 through 3, wherein the collar has a cylindrical shape to receive the housing mounted along the interior surface of the collar and includes a bore in a center of the cylindrical shape, the bore being parallel to the housing mounted along the interior surface of the collar.

Statement 5: An acoustic system according to Statements 1 through 4 wherein the collar has an aperture to a wellbore allowing the transducer to capture a visual scan of a downhole environment.

Statement 6: An acoustic system according to Statements 1 through 5, wherein the collar comprises a titanium collar.

Statement 7: An acoustic system according to Statements 1 through 6, wherein the housing is subjected to a force and bends up to twenty degrees.

Statement 8: An acoustic system according to Statements 1 through 7, wherein the collar has a diameter of 4.75 inches.

Statement 9: An acoustic system comprises a first electrical connector, a second electrical connector, a third electrical connector, and a fourth electrical connector, a first transducer connected to the first electrical connector, a second transducer connected to the second electrical connector, a third transducer connected to the third electrical connector, and a fourth transducer connected to the fourth electrical connector, a first fluid compensating piston connected to the first electrical connector, a second fluid compensating piston connected to the second electrical connector, a third fluid compensating piston connected to the third electrical connector, and a fourth fluid compensating piston connected to the fourth electrical connector, a first housing having the first electrical connector, the first transducer, and the first fluid compensating piston arranged in a linear arrangement, a second housing having the second electrical connector, the second transducer, and the second fluid compensating piston arranged in the linear arrangement, a third housing having the third electrical connector, the third transducer, and the third fluid compensating piston arranged in the linear arrangement, a fourth housing having the fourth electrical connector, the fourth transducer, and the fourth fluid compensating piston arranged in the linear arrangement, and a collar having the first housing mounted along a first interior surface of the collar, the second housing mounted along a second interior surface of the collar, the third housing mounted along a third interior surface of the collar opposite the first interior surface of the collar, and the fourth housing mounted along a fourth interior surface of the collar opposite the second interior surface of the collar.

Statement 10: An acoustic system according to Statement 9, wherein the first transducer, the second transducer, the third transducer, and the fourth transducer together facilitate image processing of data captured by the acoustic system.

Statement 11: An acoustic system according to Statements 9 and 10, wherein the first transducer, the second transducer, the third transducer, and the fourth transducer receive the data captured by the acoustic system and create a visual scan of a downhole environment.

Statement 12: An acoustic system according to Statements 9 through 11, wherein the collar has a cylindrical shape to receive the first housing mounted along the first interior surface of the collar, the second housing mounted along the second interior surface of the collar, the third housing mounted along the third interior surface of the collar, and the fourth housing mounted along the fourth interior surface of the collar, and includes a bore in a center of the cylindrical shape, the bore being parallel to the first housing mounted along the first interior surface of the collar, the second housing mounted along the second interior surface of the collar, the third housing mounted along the third interior surface of the collar, and the fourth housing mounted along the fourth interior surface of the collar.

Statement 13: An acoustic system according to Statements 9 through 12, wherein the collar has a first aperture to a wellbore allowing the first transducer to capture a visual scan of a downhole environment, a second aperture to the wellbore allowing the second transducer to capture the visual scan of the downhole environment, a third aperture to the wellbore allowing the third transducer to capture the visual scan of the downhole environment, and a fourth aperture allowing the fourth transducer to capture the visual scan of the downhole environment.

Statement 14: An acoustic system according to Statements 9 through 13, wherein the collar comprises a titanium collar.

Statement 15: An acoustic system according to Statements 9 through 14, wherein at least one of the first housing, the second housing, the third housing, and the fourth housing is subjected to a force and bends up to twenty degrees.

Statement 16: An acoustic system according to Statements 9 through 15, wherein the collar has a diameter of 4.75 inches.

Statement 17: A method comprising capturing, by a first acoustic sensor, a first visual scan of a downhole environment, capturing, by a second acoustic sensor, a second visual scan of the downhole environment, capturing, by a third acoustic sensor, a third visual scan of the downhole environment, capturing, by a fourth acoustic sensor, a fourth visual scan of the downhole environment, and combining the first visual scan of the downhole environment, the second visual scan of the downhole environment, the third visual scan of the downhole environment, and the fourth visual scan of the downhole environment into a combined visual scan of the downhole environment.

Statement 18: A method according to Statement 17, further comprising simultaneously capturing the first visual scan of the downhole environment, the second visual scan of the downhole environment, the third visual scan of the downhole environment, and the fourth visual scan of the downhole environment as a high-resolution visual scan of the downhole environment.

Statement 19: A method according to Statements 17 and 18, wherein the first acoustic sensor is mounted along a first interior surface of a housing, the second acoustic sensor is mounted along a second interior surface of the housing, the third acoustic sensor is mounted along a third interior surface of the housing opposite the first interior surface of the housing, and the fourth acoustic sensor is mounted along a fourth interior surface of the housing opposite the second interior surface of the housing, and the housing is rotating in the downhole environment.

Statement 20: A method according to Statements 17 through 19, further comprising transmitting the combined visual scan to a computing device.

Statement 21: A system comprising means for performing a method according to any of Statements 17 through 20.

I claim:

1. An acoustic system comprising:
   an electrical connector;
   at least one transducer connected to the electrical connector;
   a fluid compensating piston connected to the electrical connector;
   a housing having the electrical connector, the at least one transducer, and the fluid compensating piston arranged in a linear arrangement; and
   a collar having the housing mounted along an interior surface of the collar;
   wherein the at least one transducer facilitates image processing of data captured by the acoustic system and the transducer receives the data captured by the acoustic system and creates a visual scan of a downhole environment.

2. The acoustic system of claim 1, wherein the collar has a cylindrical shape to receive the housing mounted along the interior surface of the collar and includes a bore in a center of the cylindrical shape, the bore being parallel to the housing mounted along the interior surface of the collar.

3. The acoustic system of claim 2, wherein the collar has an aperture to a wellbore allowing the transducer to capture a visual scan of a downhole environment.

4. The acoustic system of claim 1, wherein the collar comprises a titanium collar.

5. The acoustic system of claim 1, wherein the housing is subjected to a force and bends up to twenty degrees.

6. The acoustic system of claim 1, wherein the collar has a diameter of 4.75 inches.

7. An acoustic system comprising:
a first electrical connector, a second electrical connector, a third electrical connector, and a fourth electrical connector;
a first transducer connected to the first electrical connector, a second transducer connected to the second electrical connector, a third transducer connected to the third electrical connector, and a fourth transducer connected to the fourth electrical connector;
a first fluid compensating piston connected to the first electrical connector, a second fluid compensating piston connected to the second electrical connector, a third fluid compensating piston connected to the third electrical connector, and a fourth fluid compensating piston connected to the fourth electrical connector;
a first housing having the first electrical connector, the first transducer, and the first fluid compensating piston arranged in a linear arrangement;
a second housing having the second electrical connector, the second transducer, and the second fluid compensating piston arranged in the linear arrangement;
a third housing having the third electrical connector, the third transducer, and the third fluid compensating piston arranged in the linear arrangement;
a fourth housing having the fourth electrical connector, the fourth transducer, and the fourth fluid compensating piston arranged in the linear arrangement; and
a collar having the first housing mounted along a first interior surface of the collar, the second housing mounted along a second interior surface of the collar, the third housing mounted along a third interior surface of the collar opposite the first interior surface of the collar, and the fourth housing mounted along a fourth interior surface of the collar opposite the second interior surface of the collar;
wherein the first transducer, the second transducer, the third transducer, and the fourth transducer receive the data captured by the acoustic system and create a visual scan of a downhole environment.

8. The acoustic system of claim 7, wherein the first transducer, the second transducer, the third transducer, and the fourth transducer together facilitate image processing of data captured by the acoustic system.

9. The acoustic system of claim 7, wherein the collar has a cylindrical shape to receive the first housing mounted along the first interior surface of the collar, the second housing mounted along the second interior surface of the collar, the third housing mounted along the third interior surface of the collar, and the fourth housing mounted along the fourth interior surface of the collar, and includes a bore in a center of the cylindrical shape, the bore being parallel to the first housing mounted along the first interior surface of the collar, the second housing mounted along the second interior surface of the collar, the third housing mounted along the third interior surface of the collar, and the fourth housing mounted along the fourth interior surface of the collar.

10. The acoustic system of claim 9, wherein the collar has a first aperture to a wellbore allowing the first transducer to capture a visual scan of a downhole environment, a second aperture to the wellbore allowing the second transducer to capture the visual scan of the downhole environment, a third aperture to the wellbore allowing the third transducer to capture the visual scan of the downhole environment, and a fourth aperture allowing the fourth transducer to capture the visual scan of the downhole environment.

11. The acoustic system of claim 7, wherein the collar comprises a titanium collar.

12. The acoustic system of claim 7, wherein at least one of the first housing, the second housing, the third housing, and the fourth housing is subjected to a force and bends up to twenty degrees.

13. The acoustic system of claim 7, wherein the collar has a diameter of 4.75 inches.

* * * * *